US009439355B2

(12) United States Patent
Surmann et al.

(10) Patent No.: US 9,439,355 B2
(45) Date of Patent: Sep. 13, 2016

(54) HEADER WITH INPUT GEARBOX

(71) Applicant: Carl Geringhoff GmbH & Co. KG, Ahlen (DE)

(72) Inventors: Klemens Surmann, Ahlen (DE); Stephan Schulze Selting, Enniger (DE); Jan Bernd Schulze Rückamp, Ennigerloh-Enniger (DE); Steffen Sudhues, Ahlen (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 0 days.

(21) Appl. No.: 14/552,776

(22) Filed: Nov. 25, 2014

(65) Prior Publication Data
US 2015/0373910 A1 Dec. 31, 2015

(30) Foreign Application Priority Data
Jun. 25, 2014 (DE) .................. 10 2014 009 159

(51) Int. Cl.
| F16H 33/08 | (2006.01) |
| A01D 69/06 | (2006.01) |
| A01D 41/14 | (2006.01) |

(52) U.S. Cl.
CPC .............. A01D 69/06 (2013.01); A01D 41/142 (2013.01)

(58) Field of Classification Search
CPC .. F16H 21/16; F16H 21/365; F16H 2712/08; F16H 3/00; Y10T 464/50; Y10T 74/18056; A01F 29/14; A01D 34/30
USPC ......... 475/269, 317, 11, 198, 220, 294, 296, 475/298; 464/180; 56/181; 74/25
See application file for complete search history.

(56) References Cited

U.S. PATENT DOCUMENTS

| 2,496,469 | A | * | 2/1950 | Hilblom | A01D 34/04 56/15.3 |
| 3,300,953 | A | * | 1/1967 | Glass | A01D 43/105 192/46 |
| 3,324,638 | A | * | 6/1967 | Koch | A01D 34/30 56/14.5 |
| 3,561,203 | A | * | 2/1971 | Hurlburt | A01D 34/30 464/180 |
| 3,739,559 | A | * | 6/1973 | Long | A01D 69/06 241/101.71 |
| RE32,599 | E | * | 2/1988 | Musser | A01D 69/00 56/10.8 |
| 6,425,232 | B1 | * | 7/2002 | Desnijder | A01D 43/086 241/101.763 |
| 2004/0060271 | A1 | * | 4/2004 | Ameye | A01F 29/14 56/10.8 |
| 2005/0193705 | A1 | * | 9/2005 | Wubbels | A01D 69/00 56/51 |
| 2007/0087891 | A1 | * | 4/2007 | Schumacher | A01D 34/30 475/317 |
| 2010/0095645 | A1 | * | 4/2010 | Tippery | A01D 34/305 56/13.6 |
| 2010/0095646 | A1 | * | 4/2010 | Schmidt | A01D 41/14 56/14.3 |

* cited by examiner

Primary Examiner — Árpád Fábián-Kovács
(74) Attorney, Agent, or Firm — Gudrun E. Huckett

(57) ABSTRACT

A header for attachment to an agricultural machine is provided with a frame, a driven moveable cutting device connected to the frame, and a driven movable conveying device connected to the frame. A gearbox is connected to the frame and transmits a drive force onto the cutting device and the conveying device. The gearbox is provided with an input gearbox arranged in a first housing and a main gearbox arranged in a second housing. A separation site is formed between the input gearbox and the main gearbox. The input gearbox is arranged at a back of the header. The input gear box is a rotary speed adapter exchangeable for a gearbox with different gearing ratio.

12 Claims, 5 Drawing Sheets

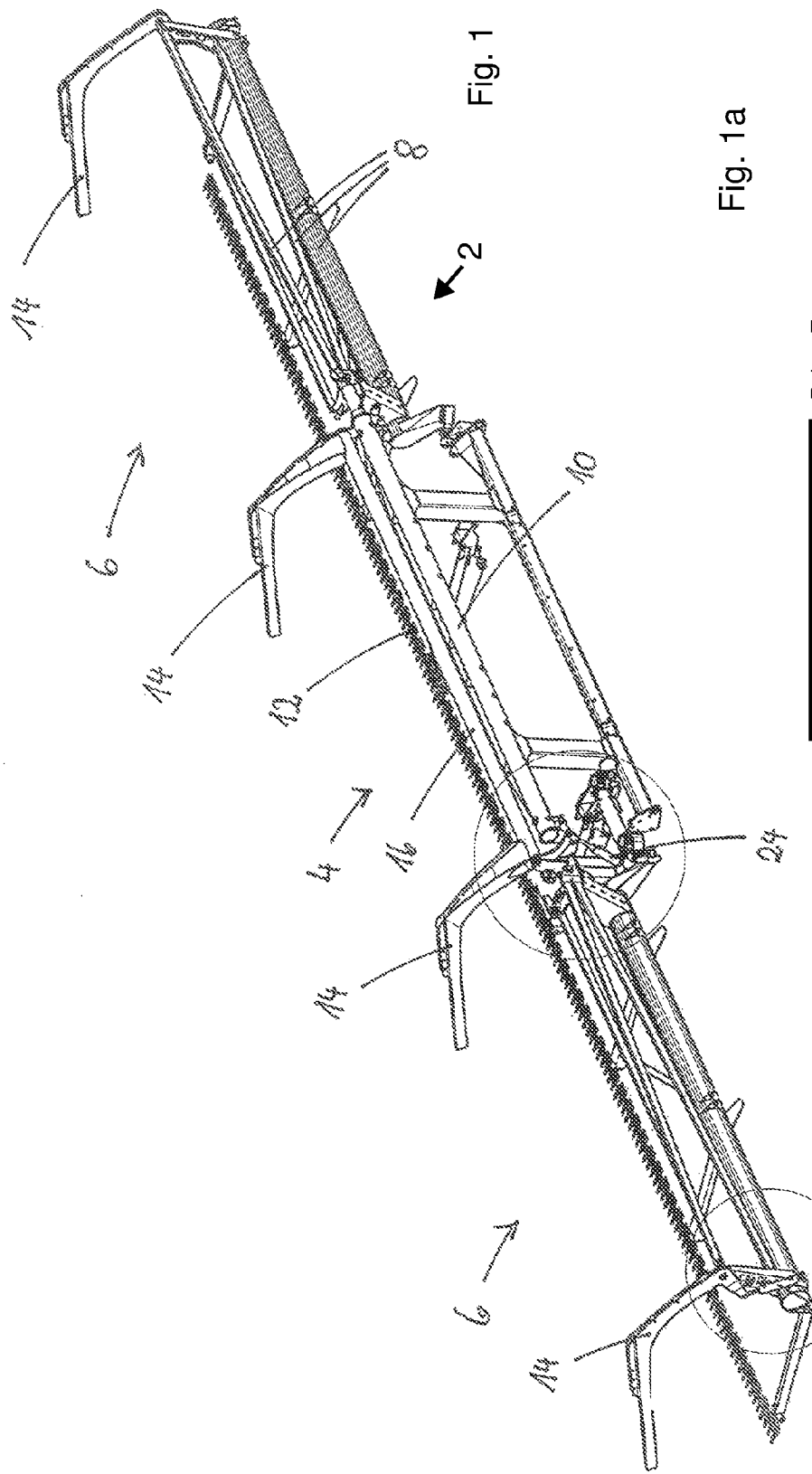
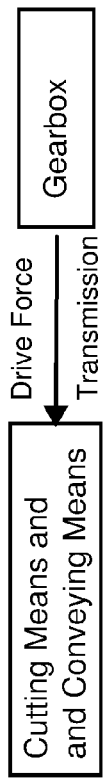

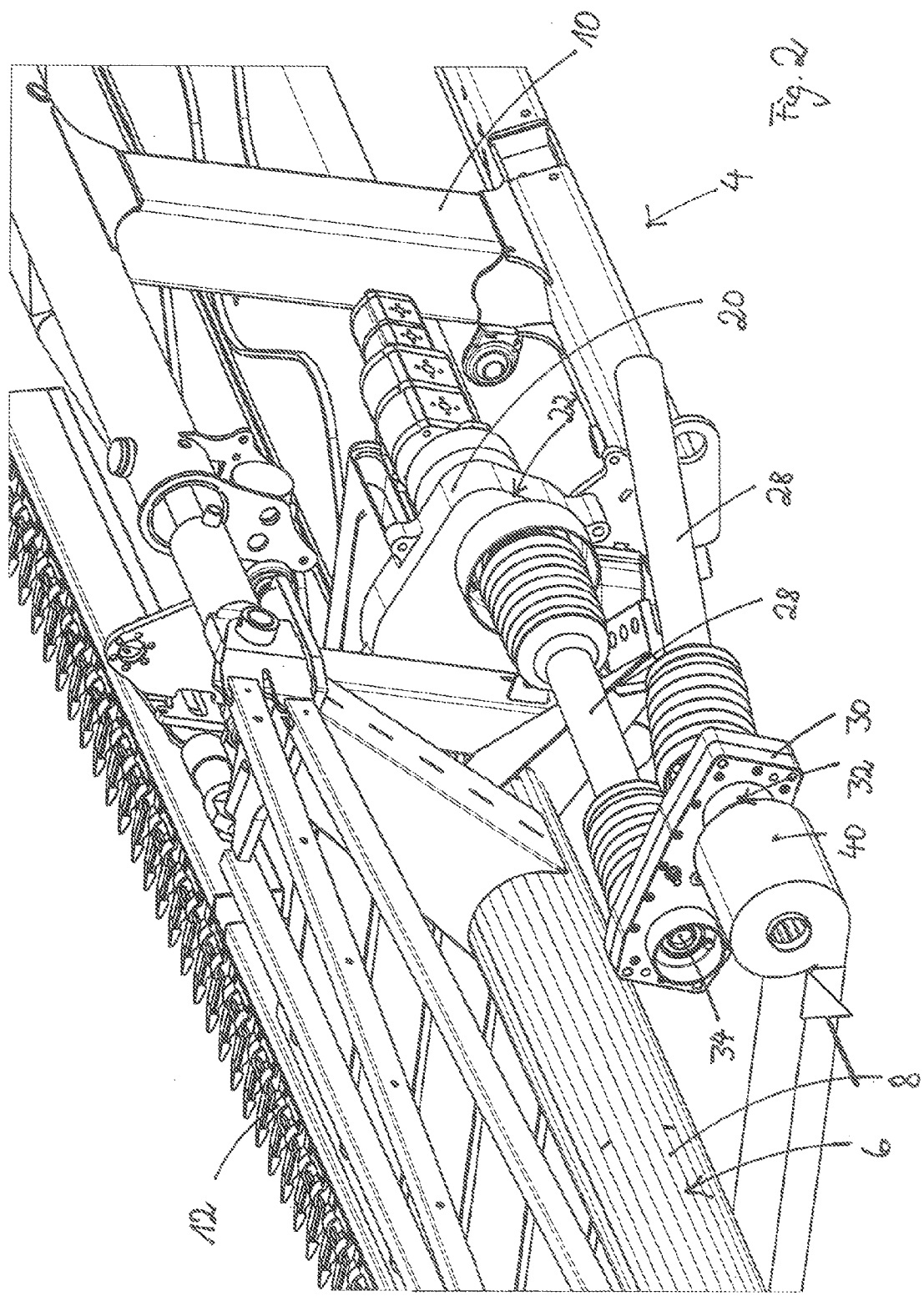

A - Separation site between 32 / 28 with shaft connectors
B - Separation site between 28 / 22 with shaft connectors
C - Separation site between 34 / 28 with shaft connectors
D - lateral displacement 32 / 34

30 - Gear box with schematic gears
30' - Exchangeable Input Gear Box with Different Gear Ratio

HEADER WITH INPUT GEARBOX

BACKGROUND OF THE INVENTION

The present application concerns a header for attachment to an agricultural machine, comprising a frame, driven moveable cutting means held therein and driven movable conveying means, and a gearbox for transmitting the drive force onto the cutting means and the conveying means.

Headers of the aforementioned kind are known, for example, as grain headers which can be attached to a combine harvester. As a result of their great working width, the headers are not connected to be fast with the combine harvester but are easily attachable and detachable in order to be able to drive the combine harvesters without headers on public roads for transfer from one field to another field. Between the combine harvester and the header, there is therefore a defined interface by means of which the header can be simply detached from and attached again to the combine harvester. In this context, in addition to the holders that hold the header according to purely static requirements, also electrical, mechanical, and hydraulic connections for driving and controlling various work functions of the header must be easily separable and re-connectable in order to simplify and accelerate the attachment and detachment of the header.

Often, buyers of combine harvesters will buy their header from the manufacturer who also has produced the combine harvester so that the combine harvester and the header are matched to each other. However, it is often also the case that manufacturers of special headers such as maize pickers, soybean headers, draper headers, and the like produce and sell headers that have even better technical properties in comparison to the header products of the combine harvester manufacturers. In these cases, the customer buys a header from a manufacturer who is not identical with the manufacturer of the combine harvester. In such cases, the header must also properly function on the third-party make of the combine harvester. This can be a problem for the manufacturer of the header when the rotary speeds of the auxiliary drives of individual combine harvester manufacturers differ, in particular the rotary speed of the power take-off shaft at the front end of the feed channel from which the mechanical drive actions of a header receive their drive force.

In order to be able to operate the header during harvest at the rotary speed level predetermined respectively by the manufacturer, the manufacturers of the special headers must make available different gearbox versions in which the rotary speeds of the output shaft of the combine harvester are increased or decreased to a matching level for the attachment of their header to the respective combine harvester makes. This causes a significant expenditure in the construction, the production, and logistics. Also, a used header with the respective gearbox can only be resold to an interested person who has a corresponding combine harvester make so as not to have to exchange the complete gearbox.

It is the object of the present invention to reduce the expenditure for the rotary speed adaptation of headers to the rotary speed level of different combine harvester manufacturers.

SUMMARY OF THE INVENTION

The object is solved for a header of the aforementioned kind in that the gearbox comprises an input gearbox arranged in a first housing and a main gearbox arranged in a second housing, wherein between the input gearbox and the main gearbox a separation site is formed, the input gearbox is arranged at the rear of the header, and the input gearbox is designed as a rotary speed adapter exchangeable for a gearbox with different gearing ratio.

By dividing the gearbox for transmitting the mechanical drive force onto the mechanically driven components of the header into an input gearbox and a main gearbox, it is possible to adapt only the input gearbox to the respective step-up or reduction gearing requirements of the mechanical drive of the header. The drive concept of the header, including the main gearbox, can then be designed for a desired nominal rotary speed. The drive actions of the cutting means such as, for example, an oscillatingly driven cutter bar can be configured very precisely for a nominal rotary speed, and the conveying means such as, for example, a conveying auger or conveying belts in a draper header can be matched optimally with their working speeds to a nominal rotary speed.

In addition to the rotary speed adaptation, an adaptation of the torque that is acting on the main gearbox is also possible by changing the gearing ratio. When the input rotary speed into the main gearbox is higher, the torque drops, and when the drive rotary speed is lowered, the torque increases. In certain situations, the torque adaptation is even more important than the rotary speed adaptation because the load configuration has a significant effect on a long service life and the wear of the header. By means of the input gearbox, a customer has the option to increase the working rotary speed or the torque in his header in a targeted fashion as desired, depending on in which direction he wants optimization, by installing an input gearbox with a certain gearing ratio.

The main gearbox can be very slim and of a lightweight design because it is no longer required to take into consideration and to realize possible rotary speed and torque adaptations. The adaptation of the header to the special mechanical output rotary speeds of individual manufacturers of combine harvesters is realized only by the installation of an input gearbox with a matching gearing unit into the header that enables an appropriate step-up or reduction gearing action. When no step-up or reduction gearing action is required, an input gearbox is selected that has a gearing ratio of 1:1.

Due to the defined separation site between the input gearbox and the main gearbox, the input gearbox is easily attachable to and detachable from a header. It is not required to detach the entire main gearbox from the header; the latter can instead remain permanently on the header. This is also true in case that the header for operation with a combine harvester make must be retrofitted to another one. Since the input gearbox must have only a single step-up or reduction stage, the housing as a whole can be designed comparatively lightweight and easily accessible so that the installation and detachment as well as servicing can be even more simplified. For the adaptation of the rotary speed level from one to another combine harvester manufacturer, it may be sufficient to change the gears within the input gearbox from the input shaft to the output shaft and vice versa or to change the gear set, which is possible in a comparatively inexpensive way. A used header with the input gearbox that is embodied separate from the main gearbox in accordance with the invention is of interest for users of all combine harvester makes because it is easily adaptable to the rotary speeds of the respective output so that the value of such a used header as well as its marketability increase.

The input gearbox can also be demounted at the separation site in order to make the header as slim and spacesaving as possible for transport. In case of a detached input gearbox, the header can be transported, for example, even when standing on the back so that a low center of gravity of the header during transport with an appropriately reduced tilting tendency and minimal transport width result.

Due to the arrangement of the input gearbox at the back of the header, the mounting space above the cutter bar and the conveying means within the header remains free so that the driver of the combine harvester can observe unhindered the flow of the crop during harvest. On the back there is sufficient mounting space available and the input gearbox is easily accessible thereat for connection to the mechanical output of the combine harvester and for decoupling when removing the header.

According to the invention, the input gearbox has thus the purpose to deliver to the main gearbox an adjusted input rotary speed by means of step-up or reduction gearing action of the rotary speed and/or of the torque of the output of the combine harvester, the input rotary speed at least approximately corresponding to the nominal rotary speed assumed upon construction of the header or the nominal torque of the header gearbox. The input gearbox in this way fulfills sort of an adapter function for adaptation of the rotary speed of an output at the combine harvester to a nominal rotary speed of a header which is to be attached to the combine harvester. In this context, minimal rotary speed deviations from the nominal rotary speed of up to 15% are acceptable so that the step-up or reduction gearing ratio realized at the input gearbox must not be selected and realized precisely such that precisely the nominal rotary speed of the header will result. The nominal torques however should not be surpassed significantly because this can cause an increased wear of the header.

According to an embodiment of the invention, the input gearbox has an input shaft and an output shaft which are connected to each other by a gear stage and the gear stage has a gearing ratio at which the output shaft of the input gearbox, when connecting the input gearbox to the output shaft of a carrier vehicle which is rotating at the nominal rotary speed, will rotate at a rotary speed which corresponds to the nominal rotary speed of the header for working operation. The step-up or reduction gearing action by means of a gear stage is inexpensive and provides a high loadability. The space requirement remains comparatively minimal. The input gearbox with a gear stage can be still designed to be comparatively lightweight.

According to one embodiment of the invention, the gear stage is a spur gear unit. Spur gear units can be produced particularly inexpensively. They are highly loadable, reliable, and low maintenance.

According to an embodiment of the invention, the input shaft of the input gearbox is connectable by an articulated shaft with the output shaft of a carrier vehicle, the output shaft of the input gearbox is connected to the input shaft of the main gearbox by means of an articulated shaft with each other, and the input gearbox has appropriate articulated shaft connectors. The articulated shafts and articulated shaft connectors can be inexpensively procured as standard components. They are technically mature and exhibit high reliability and low maintenance.

According to an embodiment of the invention, the articulated shaft connectors of the input gearbox are identically configured and enable a reverse installation of the input gearbox. An input gearbox that, in a first mounting position, increases the input rotary speed via a gear stage by 10%, for example, from 900 rpm, to 990 rpm, can also be utilized upon rotation of the mounted position by 180° into a second mounted position to lower an input rotary speed by 10%, for example, from 1,100 rpm to 990 rpm, when it is connectable in both mounted position by identically designed articulated shaft connectors with the articulated shafts to the main gearbox and the output at the combine harvester. In order to convert the step-up gearing action by the input gearbox into a reduction gearing action, it is then not required to exchange the gear set within the input gearbox but it is sufficient to rotate the input gearbox from its first mounted position into a second mounted position and to connect it to the articulated shafts.

According to one embodiment of the invention, the two articulated shafts extend at least approximately parallel to each other. Due to the at least approximate parallel guiding action, the force moments which are acting on the frame of the header are limited to a limited area and can be easily controlled by appropriate constructive measures. Hardly any torsional forces are created which would have to be absorbed additionally by the frame.

According to one embodiment of the invention, the output shaft of the input gearbox in the mounted position of the input gearbox is arranged coaxially to the input shaft of the main gearbox. Due to the coaxial position of the output shaft of the input gearbox to the input shaft of the main gearbox, the articulated shaft which connects the output shaft of the input gearbox with the input shaft of the main gearbox must not have a universal joint and can therefore be realized inexpensively and with low wear as a simple shaft in place of an articulated shaft. This embodiment is in particular possible when the frame of the header is of a rigid design and the lateral parts are not designed to be pivotable relative to the center part. In case of pivotable lateral parts, the input gearbox together with the main gearbox would have to be connected to the center part of the header in order to keep relative movements between the input gearbox and main gearbox as minimal as possible.

According to one embodiment of the invention, the input shaft of the input gearbox has a lateral displacement relative to the output shaft. The displacement of the two shafts relative to each other is bridged by the housing of the input gearbox. The displacement enables the connection of articulated shafts to the input and output shafts of the input gearbox. Remaining displacements and angular positions between the position of the output at the combine harvester and the input shaft at the input gearbox can be compensated by the articulated shaft positioned therebetween which can then be provided with appropriate universal joints. The adaptation of the header drive to the special configurations of an output of the combine harvester is then realized by means of the universal shaft and the input gearbox with its displacement and the gearing provided therein.

According to one embodiment of the invention, exchangeable gear pairs with different gearing ratio are provided for the input shaft and/or the output shaft. For obtaining a different step-up gearing ratio, it may already be sufficient to exchange just a single gear. The input gearbox can be designed such that an exchange of gear pairs is possible easily. For example, the input and/or output shafts can be provided, for example, with a cross toothing that matches that of the gears and by means of which the gears to be exchanged can be easily but fixedly connected to the shafts. Uniform gear housings for the input gearbox can be used into which, tailored to the need, only different gear pairs must be installed. Accordingly, the number of parts and the production complexity decrease which in turn lowers the costs for the manufacturer.

According to one embodiment of the invention, the input gearbox is attached to a fastening console which is connected to the frame of the header. The fastening console can simplify attachability of the input gearbox on the frame.

According to one embodiment of the invention, on the input shaft or output shaft of the input gearbox an overload protection device is formed. By an overload protection device, in case of action of force peaks, possible overload damages on the main gearbox or downstream drive components can be avoided. Conventional known systems can be used as overload protection devices.

According to one embodiment of the invention, the input shaft or output shaft of the input gearbox forms an intermediate shaft for an output to a secondary drive. The secondary drive is of interest for header functions that are not mechanically driven, for example, a hydraulic drive for rotational movement of a reel, its positional adjustment or the positional adjustment of the cutter bar or the like. Accordingly, the secondary drive can drive a hydraulic pump of a hydraulic circuit as a secondary drive with which hydraulic drives and controls of the header are operated. Also, a dynamo for generating electric current can be connected as a secondary drive. As a supplement or as an alternative, a drive of a blower can also be used as a secondary drive wherein its air stream supports conveying functions in the header and crop losses can be avoided with it.

It is expressly noted that each of the afore described embodiments of the invention, each on its own but also in any combination with each other, can be combined with the object of the independent claim inasmuch as there are no technically forced obstacles counteracting this.

Further modifications and configurations of the invention can be taken from the following subject matter description and the drawings.

BRIEF DESCRIPTION OF THE DRAWINGS

The invention will be explained in the following with the aid of an embodiment in more detail. It is shown in:

FIG. 1: a view of a header at a slant from behind;

FIG. 1a shows schematically the drive force transmitted from the gearbox to the cutting means and conveying means;

FIG. 2: an enlarged illustration of the area in which a header drive is coupled to a combine harvester.

PREFERRED EMBODIMENTS

Figure 3:
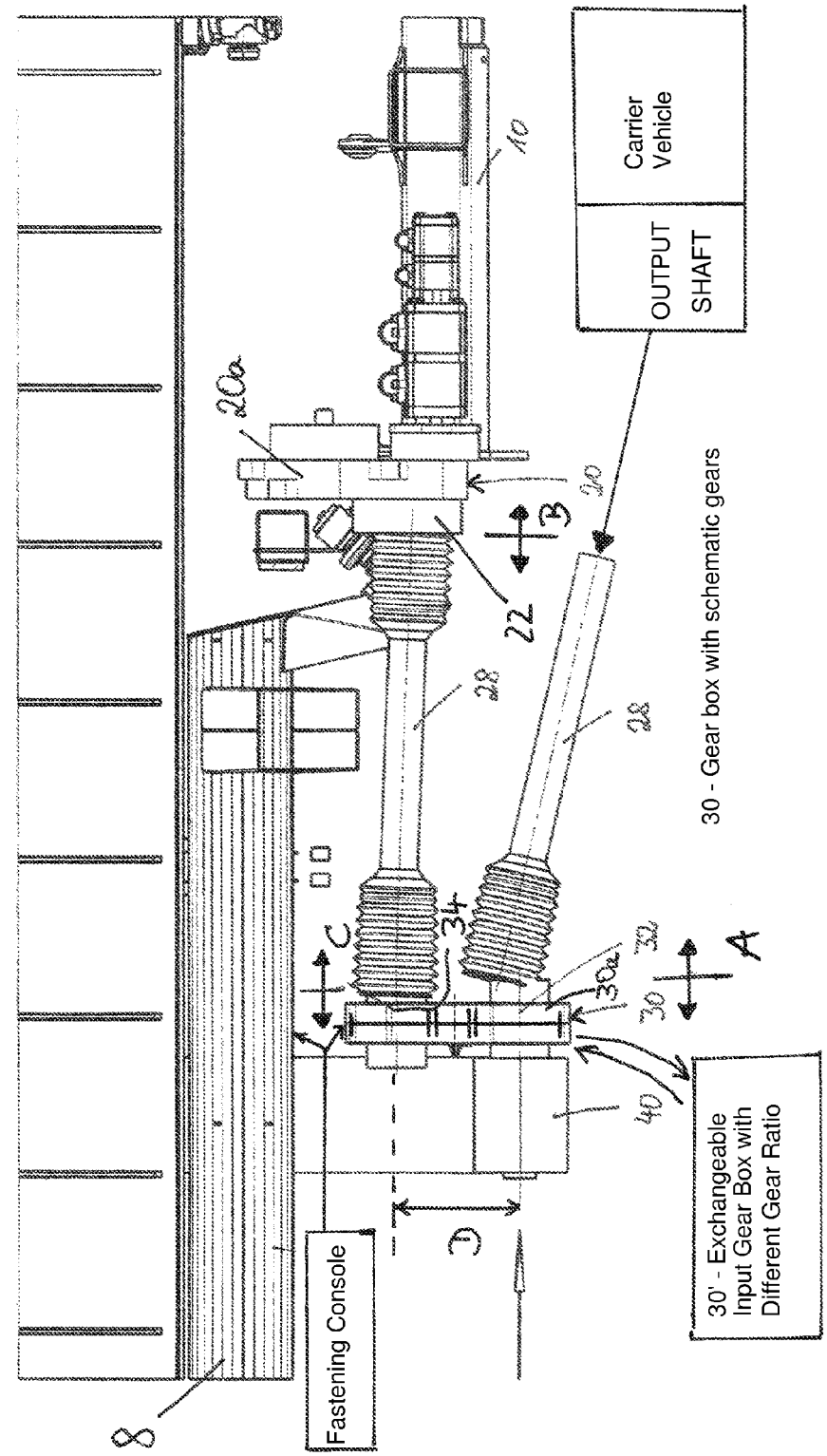
FIG. 3: a view from above onto the area illustrated in FIG. 2.
Figure 3A:
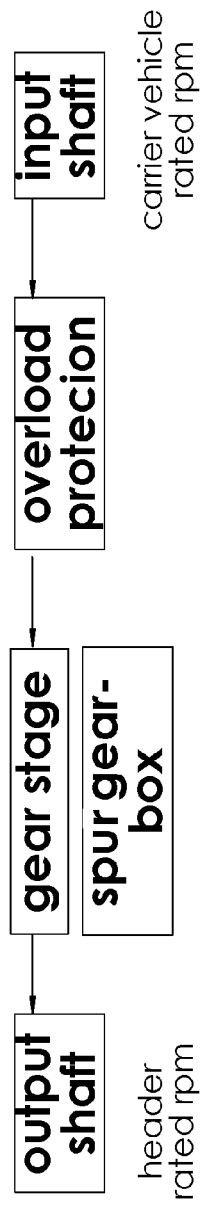
FIG. 3a shows schematically the overload protection in connection with gear stage and input and output shafts of the input gearbox.
Figure 3B:
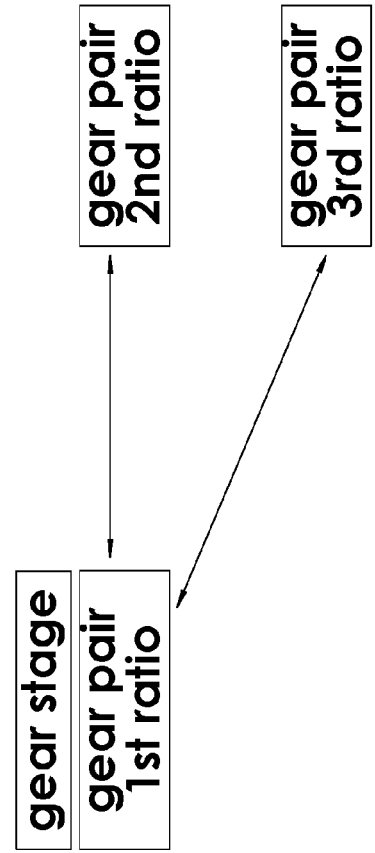
FIG. 3b shows schematically the different gear ratios for exchange in the gear stage of the input gearbox.
Figure 4A:
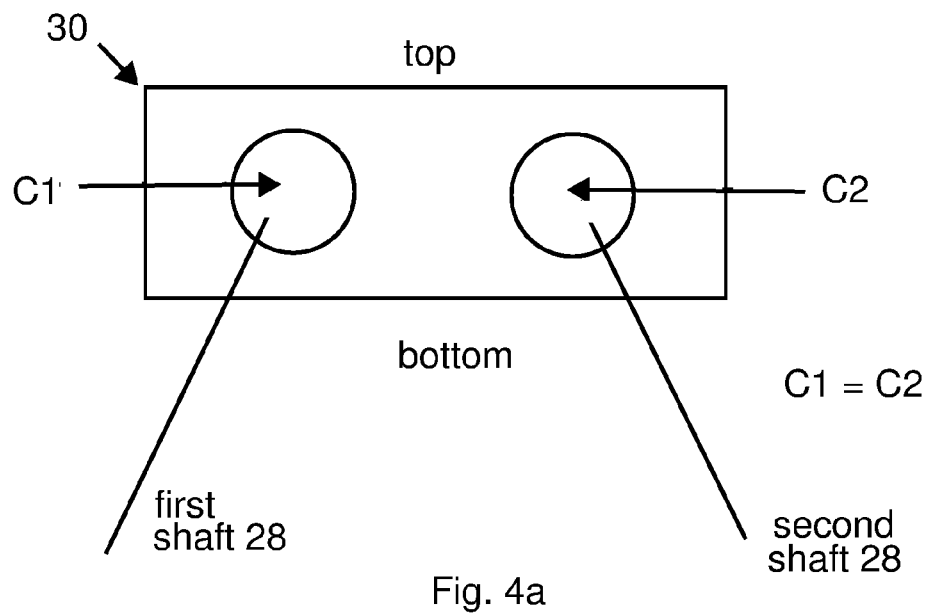
FIG. 4a shows the input gearbox with identical shaft connectors C1, C2 in a first mounted position.
Figure 4B:
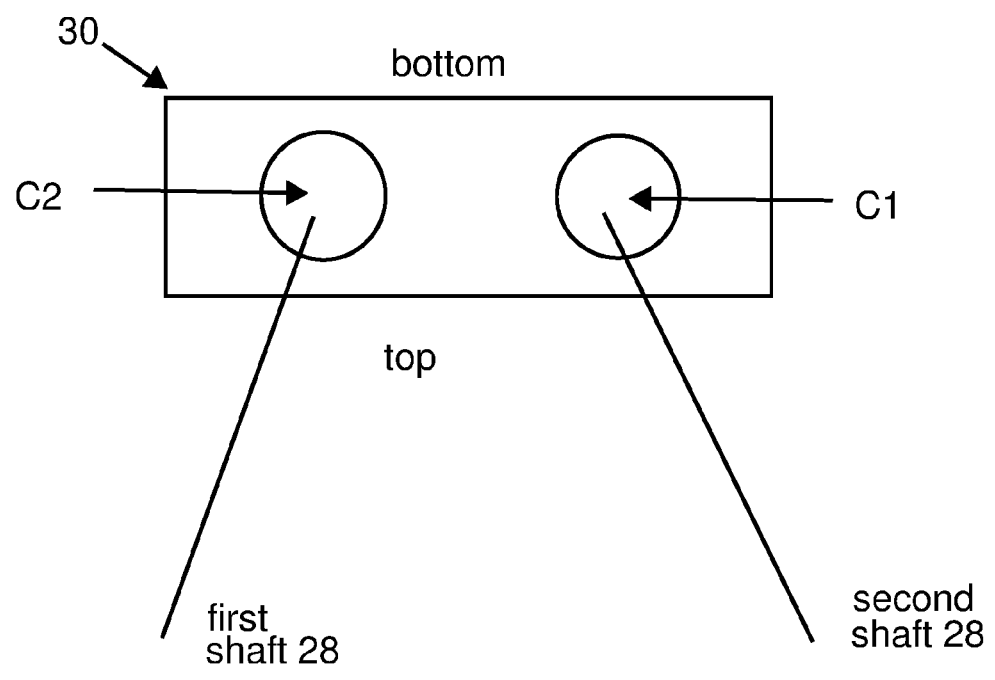
FIG. 4b shows the input gearbox with identical shaft connectors C1, C2 in a second mounted position, rotated by 180 degrees.

In FIG. 1, the basic construction of a header 2 is illustrated as an embodiment in a view from above at a slant in the travel direction of a combine harvester. The combine harvester with its feed channel is not disclosed in detail. The header 2 is comprised in the embodiment of a center part 4 having a lateral part 6 arranged at both its sides, respectively. Each lateral part 6 comprises a lateral frame 8 which is connected to the attachment frame 10. The attachment frame 10 is designed such that it surrounds the feed channel of a combine harvester, not illustrated in detail in the drawing, when the header 2 is attached to the combine harvester. By means of the attachment frame 10, the header 2 is thus connected with the feed channel of the combine harvester which supports the header 2 during harvest. At the forward end of the header 2, a cutter bar 12 is provided which is an example of cutting means attachable to the header 2 with which grain to be harvested is cut. The three reels which are arranged in a complete header 2 between the reel support arms 14 have been omitted in FIG. 1 for simplification. Also, belt conveyors which, in the completed state of the header shown in FIG. 1, transport the cut crop to the feed channel of the combine harvester and embody one embodiment of conveying means used on a header are not illustrated in detail. A main gearbox for mechanical drive action of the cutting means and conveying means of a header is usually arranged in the area of the main frame 10 because here the minimum of possible leverage forces based on the own weight of the main gearbox results.

In FIG. 2, an enlarged illustration of the area is shown in which a header drive is coupled to a combine harvester. In the enlarged illustration, the main gearbox 20 can be seen by means of which the mechanically driven components of the header 2 can be driven. The main gearbox 20 receives its input rotary speed from the input shaft 22 which is located in the main gearbox 20.

The input shaft 22 in the housing 20a (see FIG. 3) of the main gearbox 20 is driven by the articulated shaft 28 which connects the main gearbox 20 with the input gearbox 30. The input gearbox 30 comprises an input shaft 32 as well as an output shaft 34 which are each connected to an articulated shaft 28 in the embodiment. The lower articulated shaft 28 connected to the input shaft 32 can be connected at its end which is facing away from the input gearbox 30 with the output of a combine harvester, not illustrated in detail. In the embodiment, the articulated shafts 28 comprise universal joints wherein the universal joint for the lower articulated shaft 28 at the combine harvester is not illustrated.

In the view of FIG. 2, it can be seen that the input gearbox 30 can be designed to be comparatively compact and of a lightweight configuration. The input gearbox 30 is comprised of a two-part housing 30a (see FIG. 3) having in its interior a gear set, shown only schematically in the illustration of FIG. 3. The gear set rotating on the input shaft 32 and on the output shaft 34, depending on the configuration, can effect a reduction or step-up gearing action of the input rotary speed at the output of the combine harvester onto an output rotary speed of the output shaft 34 as input rotary speed to the main gearbox of the header.

In the illustrated mounted position, the input gearbox 30 can be easily attached to or detached from the header at the separation sites A, B, C (shaft connectors) and exchanged for an input gearbox 30' with different gear ratio. It is easily accessible and provides a spatial displacement between the position of the input shaft 32 and the output shaft 34 required by the two articulated shafts 28 in order to be able to rotate without colliding. In the embodiment, the two articulated shafts 28 are positioned approximately parallel to each other.

In the embodiment, a blower 40 as an example for a secondary drive is illustrated which can also be seen well in FIG. 3 in a view from above. The blower 40 obtains its drive force via of the input shaft 32 of the input gearbox 30. The air stream which is generated by the blower 40 is guided through a channel in the forward area of the header 2 where it can be utilized for avoiding grain losses.

The afore described embodiment serves only for explaining the invention. The invention is not limited to the embodiment. A person of skill in the art will have no difficulty in modifying the embodiment in a way that seems suitable in order to adapt it to a concrete application situation.

What is claimed is:

1. A header for attachment to an agricultural machine, the header comprising:
   a frame;
   driven moveable cutting means connected to the frame;
   driven movable conveying means connected to the frame;
   a gearbox connected to the frame and configured to transmit a drive force onto the cutting means and the conveying means;
   wherein the gearbox comprises an input gearbox arranged in a first housing and a main gearbox arranged in a second housing;
   wherein the input gearbox and the main gearbox are spaced apart from each other at a distance;
   an articulated shaft bridging the distance between the input gearbox and the main gearbox, wherein the articulated shaft connects an output shaft of the input gearbox to an input shaft of the main gearbox;
   wherein a separation site is formed between the input gearbox and the main gearbox so that the input gearbox is attachable and detachable at the separation site from the main gearbox, wherein the separation site comprises a first shaft connector of the input gearbox to which the articulated shaft is connected;
   wherein the input gearbox is arranged at a back of the header opposite the cutting means;
   wherein the input gear box is embodied as a rotary speed adapter exchangeable for a gearbox with different gearing ratio.

2. The header according to claim 1, wherein the input gearbox further comprises an input shaft and a gear stage, wherein the input shaft and the output shaft of the input gear box are connected to each other by the gear stage, wherein the gear stage comprises a gearing ratio configured such that the output shaft of the input gearbox, when the input shaft of the input gear box is connected to an output shaft of a carrier vehicle rotating at a nominal rotary speed, rotates at a rotary speed corresponding to a nominal rotary speed of the header for working operation of the header.

3. The header according to claim 2, wherein the gear stage is designed as a spur gearbox.

4. The header according to claim 2, wherein the input gearbox comprises a second articulated shaft connector, wherein the input shaft of the input gearbox is configured to be connected by the second articulated shaft connector by a second articulated shaft to the output shaft of the carrier vehicle.

5. The header according to claim 4, wherein the first and second articulated shaft connectors of the input gearbox are identically designed and enable a reverse installation of the input gearbox.

6. The header according to claim 4, wherein the first and second articulated shafts extend at least approximately parallel to each other.

7. The header according to claim 2, wherein the output shaft of the input gearbox in the mounted position of the input gearbox is arranged coaxial to the input shaft of the main gearbox.

8. The header according to claim 2, wherein the input shaft of the input gearbox has a lateral displacement relative to the output shaft of the input gear box.

9. The header according to claim 2, wherein the gear stage comprises exchangeable gear pairs with different gearing ratios for the input shaft and/or the output shaft.

10. The header according to claim 1, wherein the input gearbox is attached to a fastening console connected to the frame of the header.

11. The header according to claim 1, further comprising an overload protection device disposed at an input shaft or an output shaft of the input gearbox.

12. The header according to claim 1, wherein an input shaft or the output shaft of the input gearbox forms an intermediate shaft for an output to a secondary drive.

* * * * *